United States Patent

Broman et al.

[15] 3,688,560
[45] Sept. 5, 1972

[54] GAS TURBINE ENGINE WITH IMPROVED AUXILIARY POWER TAKE-OFF

[72] Inventors: Carl L. Broman, Cincinnati; Richard A. Schwieterman, Dayton, both of Ohio

[73] Assignee: General Electric Company,

[22] Filed: Jan. 29, 1971

[21] Appl. No.: 110,902

[52] U.S. Cl. ................................74/15.63, 60/39.33
[51] Int. Cl. .........F16h 37/00, F02g 1/00, F02g 3/00
[58] Field of Search.................74/15.6, 15.63, 15.66; 60/39.71, 39.33, 39.07, 39.60

[56] References Cited

UNITED STATES PATENTS 2,548,858   4/1951   Benedict...............60/39.33 X
2,608,056   8/1952   Secord et al..............60/39.33

Primary Examiner—Robert M. Walker
Attorney—Frank L. Neuhauser, Derek P. Lawrence, Oscar B. Waddell, Joseph B. Forman and Edward S. Roman

[57] ABSTRACT

The disclosure shows a gas turbine engine having a gearbox driven from the engine's compressor rotor. A power take-off shaft connects with an output gear of the gearbox and extends upwardly to a power take-off coupling on the top of the engine casing. Provision is made to shift the power take-off shaft upwardly clear of the output gear. The power take-off shaft is locked in this elevated position to facilitate removal of internal components of the gearbox for inspection and/or repair.

7 Claims, 6 Drawing Figures

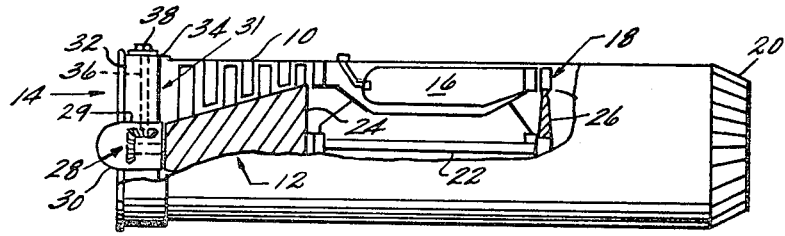
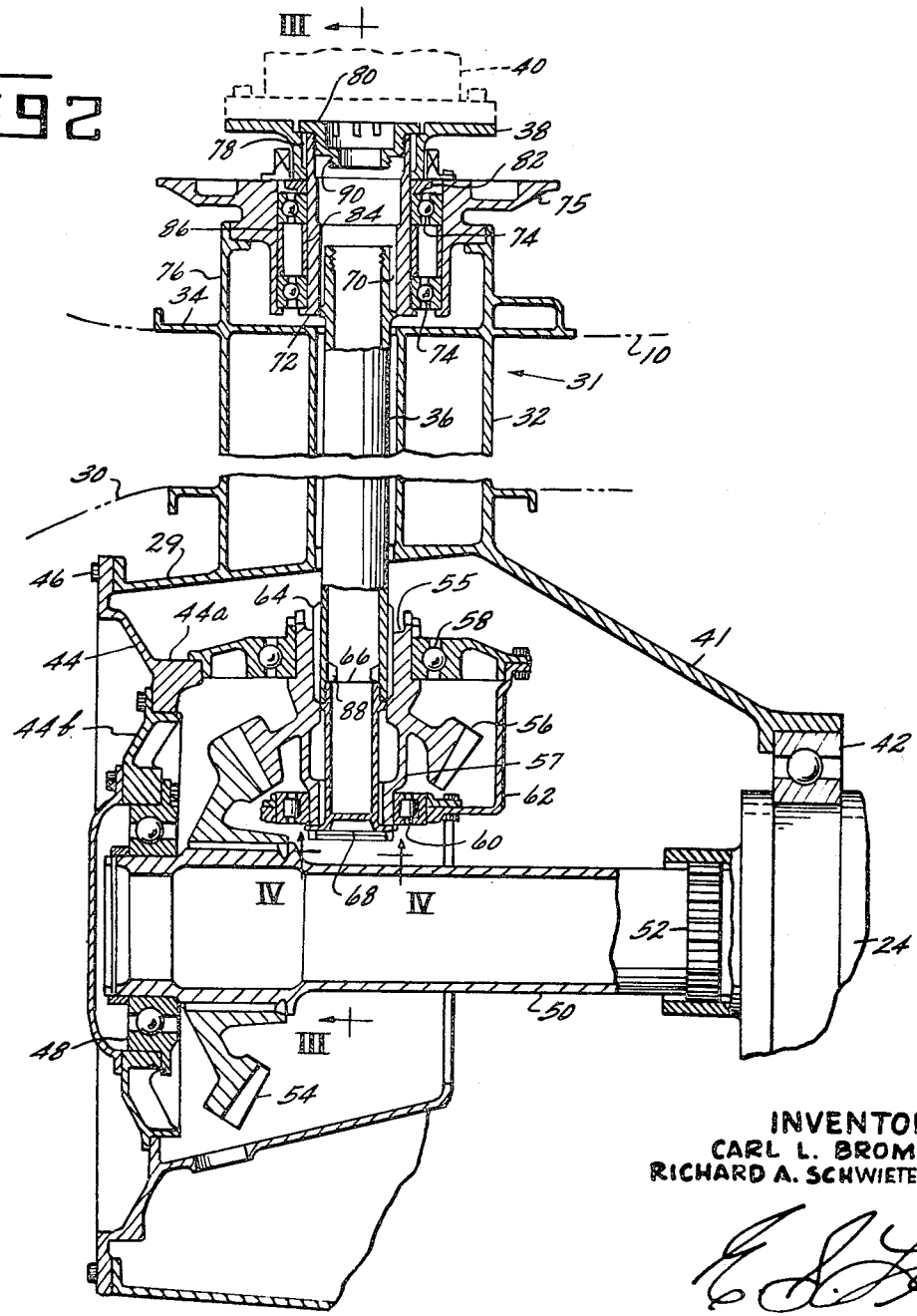

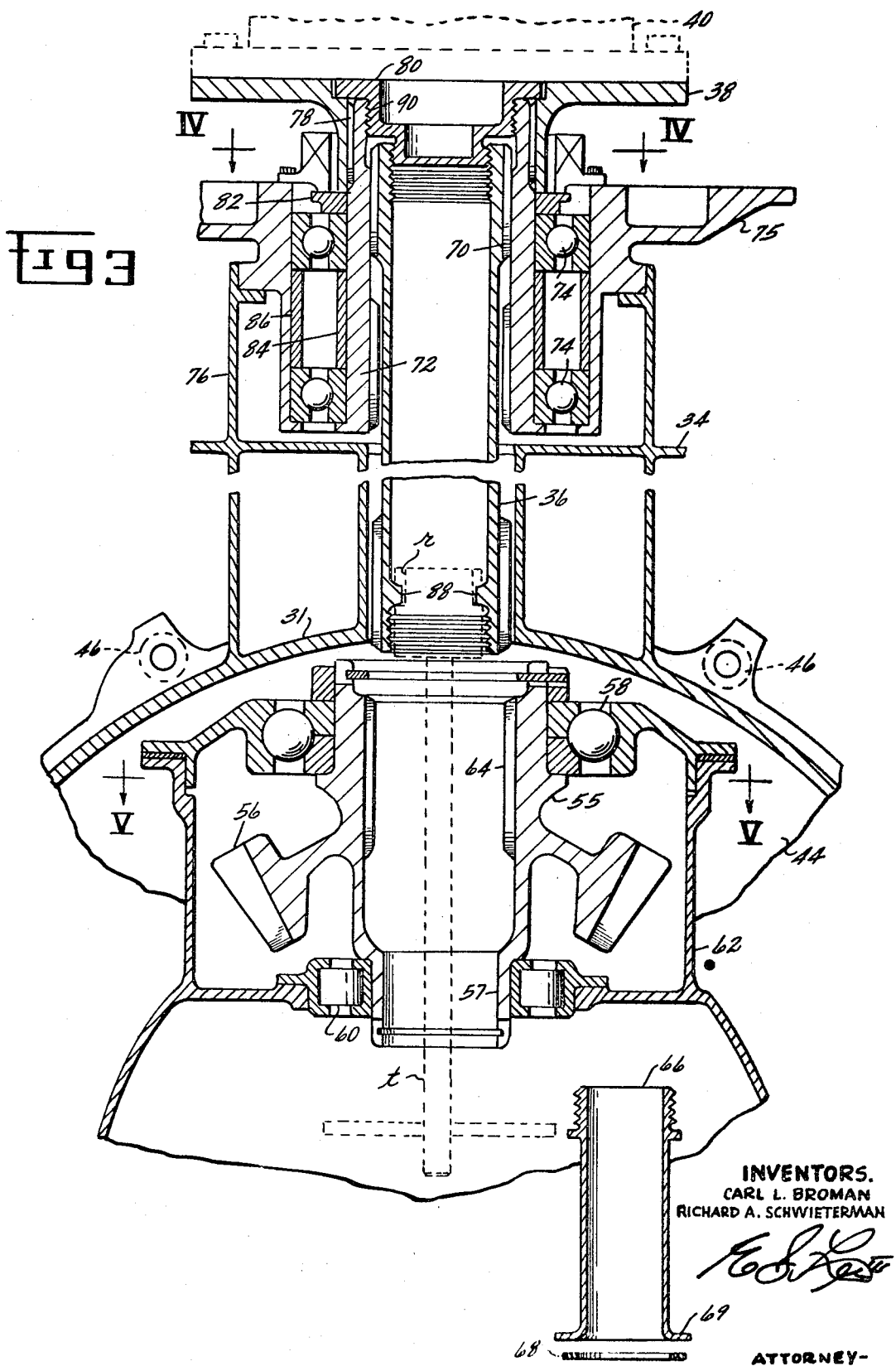

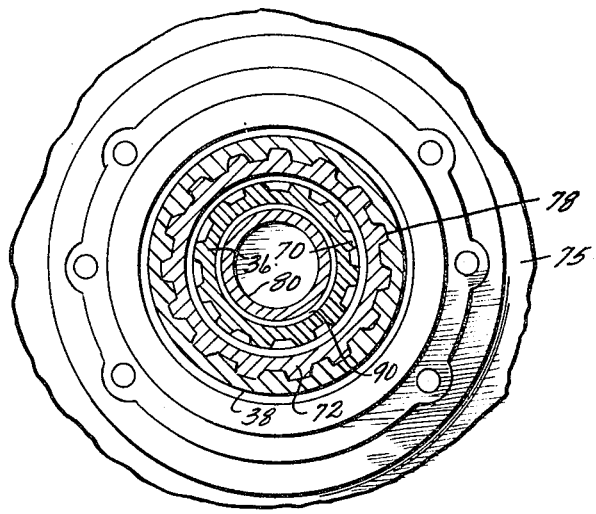
Fig. 4
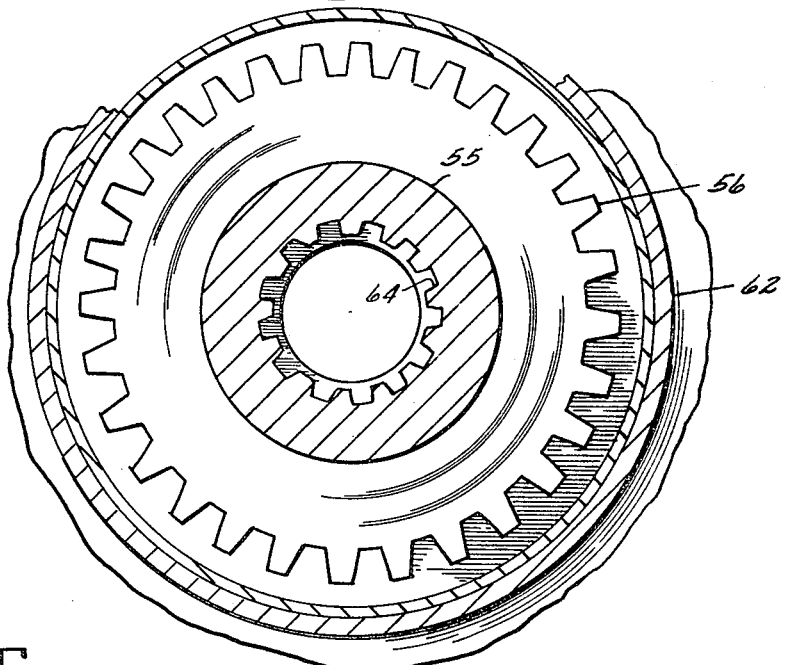
Fig. 5
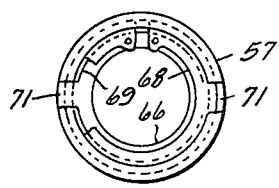
Fig. 6
INVENTORS.
CARL L. BROMAN
RICHARD A. SCHWIETERMAN
ATTORNEY

GAS TURBINE ENGINE WITH IMPROVED AUXILIARY POWER TAKE-OFF

The invention described and claimed in the United States patent application herein resulted from work done under United States Government contract FA-SS-67-7. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in gas turbine engines, and, more particularly, to improvements in deriving shaft power for driving auxiliary equipment from the engine's rotor.

Gas turbine engines comprise compressor and turbine rotors which are connected to form an engine rotor. It is common practice to derive shaft power from the engine rotor to drive such auxiliary equipment as fuel and hydraulic pumps. Usually this is done by providing a gearbox at the forward end of the compressor rotor. A set of bevel gears drives a power take-off shaft which extends radially through a frame strut to an exterior coupling which is then connected to the equipment to be driven.

Repair and inspection of such gearboxes is an essential element of engine maintenance. In the past it has been necessary to disconnect the driven, auxiliary equipment in order to shift the power take-off shaft outwardly to clear the bevel gears of the gearbox so that they may be removed for maintenance action. A partial solution to this time consuming procedure is found in U.S. Pat. No. 3,226,987, of common assignment with the present application. In the referenced patent, provision is made to disengage a power take-off shaft internally of the gearbox without disturbing the external connections thereto. While the approach therein described is highly effective in many cases, it is inapplicable to power take-off shafts that extend upwardly to driven equipment connecting with the top portion of the engine — assuming a normal mounting position with the engine axis horizontally disposed.

Accordingly, the object of the invention is to provide for removal of the internal portions of a gearbox driving an upwardly extending power take-off shaft without disturbing or disconnecting the equipment driven thereby and in doing so to provide for maximum ease in performing this maintenance function.

To these ends an upwardly extending power take-off shaft is connected, preferably by splines at its opposite ends, to the output bevel gear of the gearbox and an output coupling which is to be coupled to auxiliary equipment requiring shaft power during engine operation. Provision is made for the power take-off shaft to be displaced upwardly, clear of the output bevel gear. Means are provided for positively holding the power take-off shaft in this raised position, permitting disassembly of the internal portions of the gearbox and particularly the output bevel gear.

The above and other related objects and features of the invention will be apparent from a reading of the following description of the disclosure found in the accompanying drawings and the novelty thereof pointed out in the appended claims.

In the drawings:

FIG. 1 is a schematic view, partially in section, of a gas turbine engine having a gearbox embodying the present invention;

FIG. 2 is an enlarged, longitudinal section, with portions broken away, of the gearbox seen in FIG. 1;

FIG. 3 is a section taken on line III—III in FIG. 2;

FIG. 4 is a section taken on line IV—IV in FIG. 3;

FIG. 5 is section taken on line V—V in FIG. 3; and

FIG. 6 is a view on an enlarged scale, taken on line VI—VI in FIG. 2.

Referencing FIG. 1, a gas turbine engine, of the type employed in the propulsion of aircraft, is illustrated. This engine comprises a compositely formed outer casing 10 which houses an axial flow compressor 12. Air enters the engine inlet 14 and is pressurized by the compressor 12, being discharged to a combustor 16. The pressurized air supports combustion of fuel in the combustor to generate a hot gas stream which powers a turbine 18. The remainder of the energy of the hot gas stream is converted to a propulsive force as it is discharged from a propulsion nozzle 20.

The turbine rotor 26 is connected by a shaft 22 to the compressor rotor 24 forming an engine rotor which is appropriately journaled by on-frame members of the engine. Journaling of the forward end of the compressor rotor 24 will be later referenced.

It is common practice to extract shaft horsepower from the engine rotor to drive fuel pumps and other engine components as well as to drive certain aircraft equipment. To this end a gearbox 28 is provided at the forward end of the compressor rotor, behind a bullet nose 30. The gearbox 28 is mounted within the hollow hub or inner shell 29 of a front frame 31 which also comprises radially extending, angularly spaced struts 32 and an outer shell 34, the latter comprising the forward portion of the compositely formed casing 10.

While power take-off shafts may project through any of the angularly spaced struts 32, the present invention is concerned with power take-off shafts which extend generally upwardly from the gearbox. Thus, FIGS. 1 and 2 illustrate a power take-off shaft 36 which extends vertically through the hollow strut 32 in the "12 o'clock" position. This shaft drives a flanged, power take-off coupling 38, on the upper side of the engine. This is a convenient location for connecting with a shaft 40 which is an airframe component for driving such items as generators and hydraulic pumps.

The inner shell 29, forming the gearbox 28, comprises an annular frame extension 41 for mounting a bearing 42 which journals the forward end of the compressor rotor 24. The forward end of the gearbox is sealed by a composite plate 44 which is attached to the frame hub by screws 46. The aft end of the gearbox, at bearing 42, is sealed by known rotary seals, not shown.

A bearing 48, mounted on the end plate 44, journals one end of an input shaft 50 which is connected to the compressor rotor 24 by splines indicated at 52. An input bevel gear 54 is appropriately locked on the shaft 50 and meshes with an output bevel gear 56. The bevel gear 56 has integral shaft extensions 55 and 57 which are respectively mounted by bearings 58 and 60 on a housing 62 formed integrally with the outer annular portion 44a of the end plate 44. The power take-off shaft 36 is rotatively connected to the bevel gear 56 by a spline connection 64. Its axial position is positively maintained by a sleeve 66 threaded into its lower end. The assembled sleeve and shaft are held in elevated position by a snap ring 68 which yieldingly engages a groove interiorly of the lower extension 57 of gear 56 (see also FIG. 6). The snap ring 68 captures a flange 69 at the lower end of the sleeve 66. Lugs 71, projecting from this flange, are received by cross slots in the lower end of extension 57 to prevent relative rotation and unthreading of the sleeve 66 from the shaft 36. The described assembly can be accomplished by reason of the splined connection 70 of the upper end of the shaft 36 with a driven sleeve 72.

The sleeve 72 is rotatably mounted, by bearings 74, on a bushing 75 which is secured to and projects within a boss 76 formed integrally with the outer frame shell 34. The flanged coupling 38 is rotatively coupled to the sleeve 72 by a spline connection 78 and held in assembled relation by a nut 80 so that the sleeve 72 becomes a component of the power take-off coupling. The take-off coupling 38 bears against a wear ring 82 which, in turn, bears against the inner race of the upper bearing 74 and then through a spacer 84 and the inner race of the lower bearing 74 against a lip on sleeve 72 to provide a rigid assembly held together by the nut 80. The outer races of the bearings 74 are separated by a spacer 86 and supported by an inturned lip at the lower end of the bushing 75. Provisions are preferably made for lubricating this upper assembly as well as the gearbox, but since they do not form a part of this invention, they have been omitted for the sake of clarity.

With the described gearbox and power take-off system, maintenance and assembly are greatly simplified, particularly when the engine is mounted in an aircraft preventing access to the upper end of the take-off shaft 36. Gearbox maintenance is performed, after removal of the bullet nose 30, by removing the inner portion 44b of the end plate 44 whereupon the gear 54 and shaft 50 may be withdrawn in a forwardly direction as is indicated by their omission from FIG. 3. This provides access for removal of the snap ring 68. The shaft 36 will drop a short distance permitting the sleeve 66 to be unthreaded and removed. The shaft 36 may then be raised and a tool *t* inserted therein. The tool *t* has recesses *r* which receives lugs 88 projecting inwardly of the shaft 36. The tool *t* may then be used to elevate the shaft 36 above its spline connections 64 and 70 (with the gear 56 and sleeve 72 respectively). The upper end of the shaft 36 is internally threaded. In the elevated position of the shaft 36 these threads engage male threads 90 on the nut 80. The tool *t* may then be utilized to rotate the shaft 36 so that the shaft is coupled to the male threads 90 and positively hold in the raised position illustrated in FIG. 3. In this position the shaft 36 is disengaged from the gear 56, being above its upper shaft extension 55. The screws 46 may then be removed and the outer portion 44a of the end plate 44 pulled from the gearbox along with the assembly of gear 56 and bearings 58, 60 which are mounted thereon. If other power take-off shafts are driven from gear 54 similar provisions would be made to disconnect these shafts in order to accomplish the described disassembly operation. After inspection and repair of the removed gearbox components, they can readily be reinstalled following the above procedure in reverse.

Variations in the preferred embodiment described will occur to those skilled in the art within the spirit and scope of the present inventive concepts which are therefore to be derived solely from the following claims.

Having thus described the invention, what is novel and desired to be secured by Letters Patent of the United States is:

1. In a gas turbine engine
a gearbox driven from the engine rotor comprising
a power take-off shaft extending upwardly from the gearbox to the outer engine casing
a power take-off coupling mounted on the exterior of the engine casing and driven by said power take-off shaft,
said gearbox having a removable front cover and an output gear coaxial of and drivingly connected to said power take-off shaft,
said power take-off shaft being axially slideable relative to said power take-off coupling and said output gear to a position clear of its connection to the output gear, and
means for holding the power output shaft in said elevated position to facilitate removal of the internal components of the gearbox.

2. A gas turbine engine as in claim 1 wherein
the output gear is a bevel gear and
the gearbox comprises a driving bevel gear mounted coaxially of the engine rotor forwardly of the output gear, and the driving gear is mounted on a input shaft which is spline connected to the forward end of the engine rotor.

3. A gas turbine engine as in claim 2 wherein
the power take-off coupling has a downwardly projecting sleeve and a central threaded member at the upper end of said sleeve, the lower end of said sleeve having splines spaced from said threaded member,
said power take-off shaft having, at its upper end, a splined portion engagable with said sleeve splines to drive the take-off coupling, and a splined connection with said output gear, said power take-off shaft further having, in its upper end, a threaded portion engagable with said threaded member,
said upper splined portion clearing the sleeve splines in the elevated position of the power take-off shaft whereby this shaft may be turned onto the threaded member to hold it in the elevated position.

4. A gas turbine engine as in claim 3 wherein
the engine rotor comprises a compressor rotor at its forward end, and
further comprising
a frame member having an outer shell on which the power take-off coupling is mounted, a plurality of angularly spaced, radial struts extending inwardly therefrom, said power take-off shaft extending through one of said struts, and an inner shell forming, with the front cover, said gearbox as well as supporting the forward end of said compressor rotor from which the input shaft projects.

5. A gas turbine engine as in claim 4 wherein
the front cover comprises a central, removable, inner portion journaling the forward end of the input shaft, which, upon removal, permits removal of the input shaft and input bevel gear from the gearbox, and said front cover further comprises an outer, annular portion to which the central portion is removably secured, said outer portion including means for supporting and journaling said output bevel gear, whereby when said power take-off shaft is in its elevated position, the outer cover portion may be removed and with it the output bevel gear.

6. A gas turbine engine as in claim 5 wherein the output gear has a hollow extension received by the journaling means therefor, a locking sleeve is threaded into the lower end of said power output shaft and removable means hold the locking sleeve within said hollow extension to position the power take-off shaft to drive the power take-off coupling, said locking sleeve and said gear extension being angularly locked to prevent relative rotation.

7. A gas turbine engine as in claim 6 wherein the power take-off shaft is hollow and has inwardly projecting lugs at its lower end to facilitate threading it on said threaded member.

* * * * *